Aug. 12, 1952

H. W. JONES 2,606,675

MATERIAL TRANSPORTING AND DUMPING EQUIPMENT

Filed Oct. 11, 1950

INVENTOR

*Harry W. Jones*

BY
*Cameron, Kerkam, & Sutton*
ATTORNEYS

Aug. 12, 1952  H. W. JONES  2,606,675
MATERIAL TRANSPORTING AND DUMPING EQUIPMENT
Filed Oct. 11, 1950  2 SHEETS—SHEET 2

INVENTOR
Harry W. Jones
BY Cameron, Kerkam, & Sutton
ATTORNEYS

Patented Aug. 12, 1952

2,606,675

UNITED STATES PATENT OFFICE 2,606,675

MATERIAL TRANSPORTING AND DUMPING EQUIPMENT

Harry W. Jones, Knoxville, Tenn., assignor to Dempster Brothers, Incorporated, Knoxville, Tenn., a corporation of Tennessee Application October 11, 1950, Serial No. 189,622

8 Claims. (Cl. 214—77)

This invention relates to means for transporting and dumping materials and more particularly to improved apparatus for handling as a unit a plurality of relatively small and/or light loads.

Apparatus embodying the invention is particularly adapted for use with transporting and dumping vehicles of the type disclosed in Dempster Patents Nos. 2,179,779 and 2,281,183 and for convenience the invention will be described hereinafter in this connection, although it is to be understood that the invention is not restricted to this particular use. In the well known operation of such vehicles, a filled container is elevated from the ground along a substantially vertical skidway or frame at the rear of the vehicle, after which the skid frame and elevated container are moved forwardly on the vehicle and the container is lowered to rest on the vehicle chassis for transportation. For dumping, the container is again elevated along the skid frame and the skid frame and container are moved rearwardly, a bail on the container being then engaged with a hook on the skid frame so that the contents of the container can be dumped at the rear of the vehicle. With containers of the type shown in Patent No. 2,281,183, the bail and container are pivotally connected and dumping takes place by tilting the container about the axis of this pivotal connection.

Occasions arise when it is desirable to transport and dump small loads considerably less than the capacity of containers of the size usually employed with such vehicles, and in such cases it is wasteful and uneconomical to make a plurality of trips with containers that are only partly filled. Furthermore, it is sometimes the case that such small loads are collected at one or more points remote from or even inaccessible to the transporting vehicle, as for example in the interior of a building or other structure. In such cases the material to be transported must be carried to the container loading point as by means of barrows or carts and there loaded into the dumping container.

One of the objects of the present invention is to provide improved means whereby a plurality of such relatively small loads can be separately collected at any desired point or points and transported or dumped as a unit by the vehicle.

Another object is to provide an improved transporting and dumping container of the type described above which is adapted to receive and hold a plurality of smaller containers or receptacles to be transported and dumped as a unit.

A further object is to provide improved apparatus as characterized in the preceding objects having novel means for holding the smaller receptacles in proper position in the large container during transporting and dumping.

A still further object is to provide a novel small receptacle for use in combination with a large container as described above and provided with means whereby its contents are dumped when the large container is moved to dumping position.

Other objects will appear hereinafter as the description of the invention proceeds.

One embodiment of the invention has been illustrated in the accompanying drawings but it is to be expressly understood that said drawings are for purposes of illustration only and are not to be taken as a definition of the limits of the invention, reference being had to the appended claims for this purpose.

Figure 1:
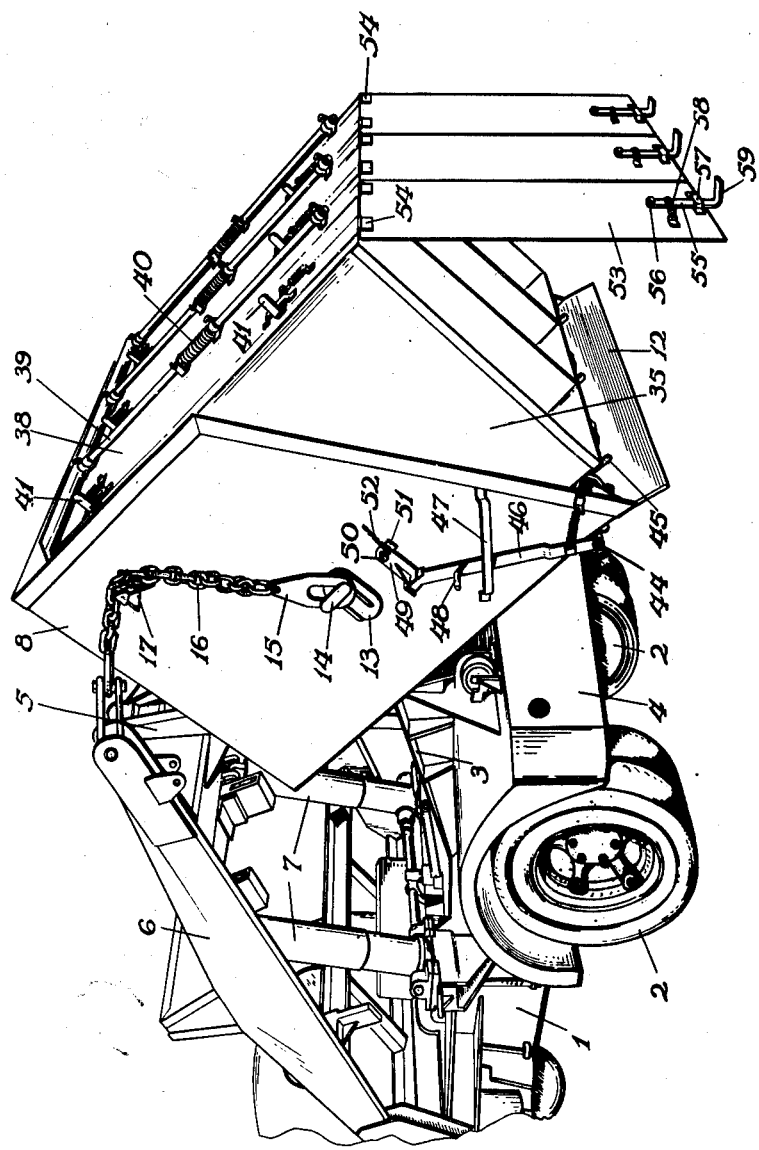
Fig. 1 is a perspective view of apparatus embodying the invention shown in dumping position.

For purposes of illustration, the drawings show a transporting and dumping vehicle of the type disclosed in the aforesaid Dempster patents. As shown in Fig. 1, the chassis 1 of the vehicle is supported by rear wheels 2 and is provided with inclined supports 3 above the rear wheels on which the container rests while it is being transported as illustrated for example in Fig. 1 of Patent No. 2,281,183. An apron 4 at the rear of the vehicle and a vertically disposed forwardly inclined frame 5 provide a skidway along which the container is elevated by means of a pivoted boom 6 operated by hydraulic cylinders 7. While this type of transporting and dumping vehicle is preferred, it will be understood that the container described hereinafter can be used with any other suitable type of vehicle or in any other desired manner.

The container preferably is substantially rectangular with an open front end (which is to the rear with respect to the vehicle) and in the form shown it comprises suitable side walls 8, a rear wall 9, and a bottom 10 provided with feet 11 which support the container when it is resting on the ground or on the inclined supports 3 mentioned above. At its open front end, the container may be provided with a relatively sharp lip 12 which is inclined downwardly from the level of the bottom wall 10 to the ground. It will be understood, however, that any other suitable container construction can be employed.

The container is provided with suitable means whereby it can be engaged and elevated from the ground. In case of use with a vehicle of the above type, these container elevating means may suitably comprise plates 13 suitably secured to the side walls 8 as by means of welding and carrying lifting pins 14. These pins can be engaged, for example, by eyes 15 on the ends of lifting chains 16 that are connected to the ends of the boom arms 6 so that when the boom is elevated, the container is lifted from the ground with its weight resting against the skid frame 5. The chains 16 preferably pass over deflector pins or brackets 17 also suitably secured to the side walls 8 of the container, these deflector pins controlling the direction of pull of the chains on the container when it is being swung back against the frame 5 from the dumping position shown in Fig. 1.

Figures 2, 3:
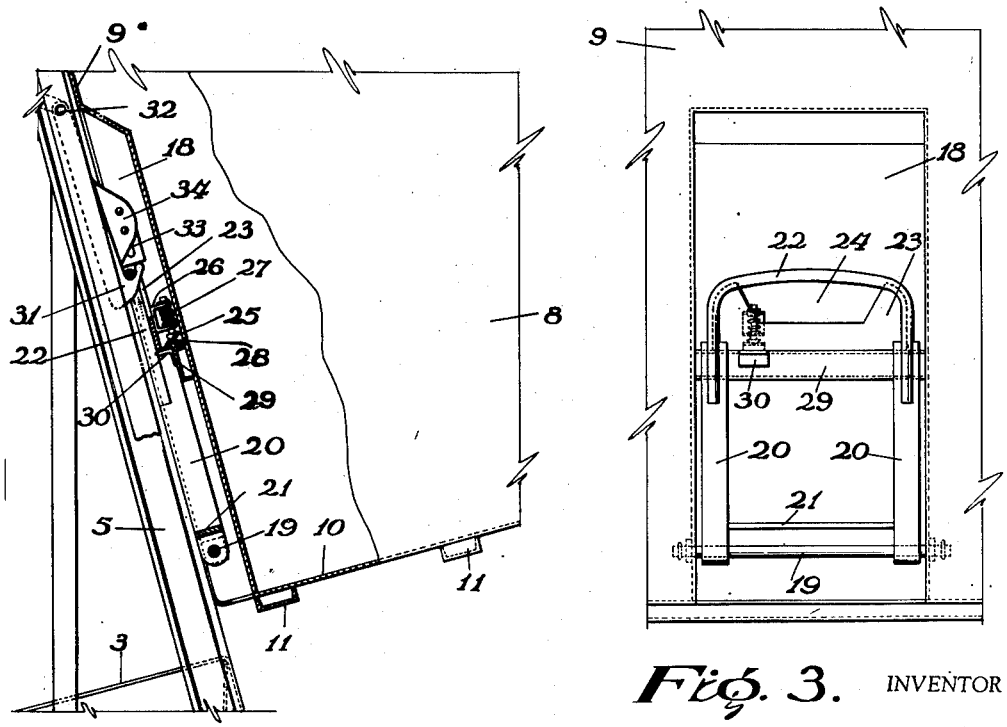
Fig. 2 is a partial side view showing the elevated container in position ready to be dumped and being partly in section to show details of the dumping bail.
Fig. 3 shows the dumping bail as seen from the rear of the container.

The container is also provided with suitable pivot means adapted to engage cooperating means on the skid frame when the container is in elevated position, the engagement between said cooperating means providing a fixed pivot about which the container tilts to the dumping position shown in Fig. 1. While these pivot means may take any of various known forms, a pivoted bail is preferred which may be mounted in any suitable manner in a recess 18 formed in the rear wall 9 of the container (see Figs. 2 and 3). As shown, a pivot shaft 19 extends across the lower part of the recess between its side wall, and a pair of arms 20 are pivotally mounted on the shaft 19 and connected by a brace 21 to swing thereon as a unit. The upper ends of the arms 20 are secured in any suitable manner as by welding to a U-shaped rod or bail 22, the side arms of which are preferably connected by a strengthening plate 23 that is notched as shown at 24 in Fig. 3. Preferably suitable means are provided for holding the bail structure normally in the recess 18 and flush with the rear wall 9 of the container. For example, a latch member 25 (Fig. 2) is mounted in a bracket 26 carried by the plate 23 and urged resiliently by a spring 27 into engagement with a suitable latch keeper 28 carried by the container. As shown, a strengthening channel 29 extends transversely across the inner wall of the recess and the latch keeper 28 is mounted on the upper flange of this channel and on a bracket 30 secured to the channel.

For dumping, the container is elevated by means of the boom 6 and chains 16, and slides along the skid frame 5 until the bail 22 passes over a suitable dumping hook 31 and the nose of the hook enters the notch 24. When the chains 16 are slacked off, therefore, the bail engages the hook (Fig. 2) and supports the container which pivots about the axis of the shaft 19 and thus tilts to the dumping position shown in Fig. 1. For this purpose the hook 31 is preferably pivoted on the skid frame at 32 and is suitably balanced so that it normally takes the position of Fig. 2. After dumping has been completed, the boom and chains are used to tilt the container in the reverse direction into engagement with the skidway and then to elevate the container further whereby the bail is disengaged from the hook and the container can be lowered to the ground or to the inclined supports 3 mentioned above. For this purpose the hook may suitably be of the type disclosed in Dempster Patent No. 2,404,830. As described in this patent, elevation of the container brings the bail 22 into engagement with a slotted shuttle plate 33 and lifts the shuttle plate between cam lugs 34 until the bail engages these lugs and swings the hook to the left about its pivot 32. After the bail passes over the lugs 34, the shuttle plate drops and the hook swings back to its balanced position. On lowering the container, the bail again passes over the cam lugs 34 but the shuttle plate 33 prevents engagement of the bail in the hook.

The materials to be transported and dumped are collected in a plurality of relatively small receptacles 35 which can be placed in the container and preferably are of substantially rectangular shape and of a size such that a desired number of them completely fill the container. As shown in Fig. 1, three such receptacles may be placed in the container at one time. Where the materials to be transported are to be collected at remote points inaccessible to the vehicle and its container, the receptacles are preferably provided with caster wheels 36 (Fig. 5) mounted in brackets 37 pivotally secured to the bottom of each receptacle. Preferably the receptacles 35 are arranged to be filled from the top, and if desired, they may be provided with lids 38 hinged at 39 to the receptacles and counterbalanced by springs 40. Suitable latches 41 may also be provided to hold the lids 38 closed except when the receptacles are being filled.

The filled receptacles are wheeled one by one into the container, passing up the lip 12 thereof and being arranged side by side between the container side walls 8. Suitable retaining means are provided to hold the receptacles in this position while the container with said receptacles therein is being transported and dumped. Preferably each receptacle is provided with a retaining member 42 such as a U-shaped bar or strap secured to the bottom wall of the receptacle adjacent its front end. These retaining members are engaged by cooperating retaining members on the container, here shown as comprising a plurality of hooks 43, one for each receptacle 35, the noses of these hooks engaging the bars 42 (Fig. 5) to hold the receptacles in the container. The hooks 43 are movable between the receptacle retaining position just described and another position in which they are out of the way so that the receptacles can be moved into or removed from the container without interference. As shown, said hooks 43 are preferably mounted on a rock shaft 44 secured to and extending transversely beneath the bottom wall 10 of the container adjacent its open front end, the hooks 43 operating in slots 45 in said bottom wall.

Figures 4, 5:
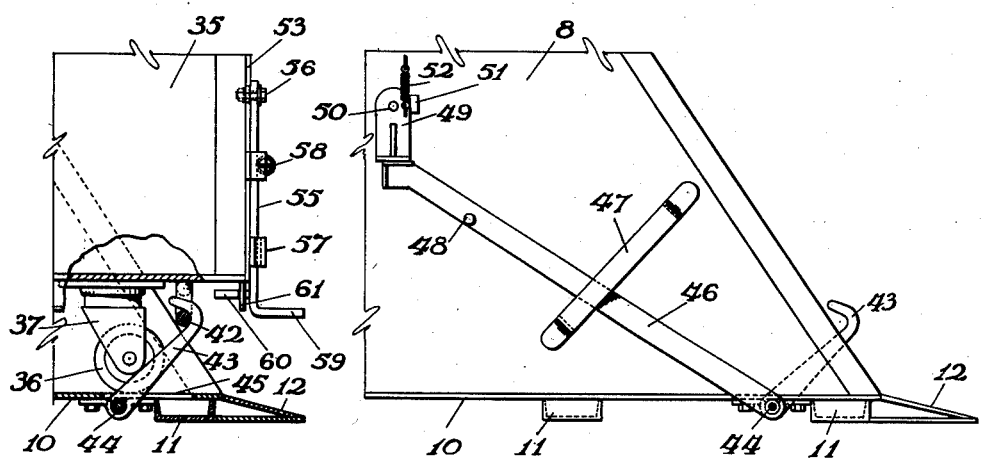
Fig. 4 is a partial side view of the container.
Fig. 5 is a partial side view illustrating one of the small receptacles in position in the container.

The hooks 43 can be operated simultaneously by rotation of the rock shaft 44 in any suitable manner as, for example, by a handle 46 secured to one end of the rock shaft and lying parallel to one of the side walls 8 of the container. Preferably the movement of the handle 46 is limited by means of a guide strap 47 secured to the side wall of the container. The handle may also be provided with a pin 48 projecting outwardly to facilitate its use. As shown in Fig. 4, the hooks 43 are elevated to retaining position when the handle 46 is depressed, and preferably suitable means are provided for locking the handle in this position such as a locking member 49 pivoted on the side wall 8 at 50 and movable into locking position against a stop 51, in which position it engages the upper edge of the handle 46 and holds it depressed. A spring 52 may be provided to urge the locking member 49 against the stop 51.

For dumping purposes, the front end wall of each receptacle is provided with a gate that swings to open position when the container and the receptacles therein are tilted to the dumping position shown in Fig. 1. Preferably and as shown, the entire front end wall 53 of each receptacle is hinged along its upper edge to the frame of the receptacle as shown at 54 so that said front end walls 53 tend to swing by their own weight to the open position shown in Fig. 1 when the receptacles are tilted. To prevent accidental opening of the end walls or gates 53, suitable cooperating latch means are provided on the lower end of each gate and on the bottom of the associated receptacles. As shown, latches 55 are pivoted at 56 on the end walls 53 and their movement is limited by guide straps 57, the latch members being urged toward closed position by springs 58. Each latch member is provided with an outwardly turned end 59 for manual operation, and also with a notched member 60 which projects inwardly beneath the bottom of the receptacle and engages a lug 61 depending from the bottom of the receptacle. The inner ends of the members 60 can be arranged at an angle such that when the gates 53 swing closed, the latches are automatically engaged. However, when the handle projections 59 are moved to the right to release the latches, gates 53 swing open in dumping position as shown in Fig. 1.

The operation will be clear from the foregoing description. In summary, the receptacles 35 are separately loaded from the top of any desired point and wheeled to and inserted in the container while the latter is resting on the ground. The handle 46 is then operated to lock the receptacles in position, after which the container and the receptacles are lifted to transporting position on the vehicle, carried to the dumping point, and then engaged with the dumping hook 31 and tilted to the dumping position shown in Fig. 1. The latches 55 being disengaged, the gates 53 swing open and the materials in the receptacles are discharged simultaneously, after which the container is tilted in the reverse direction and the gates swing closed and are automatically locked. The container with its receptacles is then returned to transporting position on the vehicle and carried to the desired point at which the container is lowered to the ground, the handle 46 operated to release the hooks 43, and the separate receptacles wheeled away for another load.

Further the materials collected in the several receptacles may be the same or different as the conditions of use of the apparatus may require. For example, the individual receptacles may be loaded with two or more different kinds of materials, all of which can be transported simultaneously but dumped separately at different points by opening the appropriate gate or gates 53 at each dumping point.

While only one embodiment of the invention has been described and illustrated in the drawings, it will be understood that the invention is not restricted to this embodiment and that various changes may be made in the form, details of construction and arrangement of the parts without departing from its spirit. Reference therefore should be had to the appended claims for a definition of the limits of the invention.

What is claimed is:

1. Apparatus of the class described for use with transporting and dumping vehicles and comprising a container having side, rear and bottom walls and an open front end, elevating means on said container whereby it may be elevated on such a vehicle, pivot means on said container adapted to engage said vehicle and provide a pivot about which the elevated container may be tilted to dumping position with its open end downwardly inclined, a plurality of receptacles fitting within said container and being movable into and removable from said container through said open front end, the front end of each receptacle comprising a gate swingable on a horizontal axis to open position when said container with said receptacles therein is in dumping position, and retaining means on said container for holding said receptacles therein in dumping position.

2. Apparatus as defined in claim 1, said gate comprising the front end wall of said receptacle hinged along its upper edge to the receptacle, the lower end of said front wall having latch means releasable in dumping position whereby said front wall swings to open position.

3. Apparatus as defined in claim 1, said retaining means comprising a plurality of retaining members one for each receptacle, and retaining member actuating means for moving said members to a position engaging and retaining said receptacles and to another position in which said receptacles are freely removable from said container.

4. Apparatus as defined in claim 3, said actuating means comprising a rock shaft mounted on and extending transversely beneath the bottom wall of said container adjacent its front end, said retaining members being movable through slots in said bottom wall.

5. Apparatus as defined in claim 4, comprising an operating handle secured to one end of said rock shaft adjacent one side wall of said container, and means on said one side wall for locking said handle in receptacle retaining position.

6. Apparatus of the class described for use with transporting and dumping vehicles and comprising a detachable container adapted to be elevated onto and transported by such a vehicle and tilted thereon to dumping position, a plurality of smaller receptacles for material to be transported and dumped, said receptacles being individually insertable into and removable from said container and also being elevatable and tilable as a unit therewith, and retaining means on said container engageable with receptacles therein for holding said receptacles in place when said container is tilted and disengageable from said receptacle for removal thereof from said container, each of said receptacles having a gate in its end which is downwardly inclined when said container is tilted whereby its contents are discharged when said container is tilted.

7. The combination defined in claim 6, said retaining means comprising a plurality of retaining members on said container and simultaneously movable thereon between a receptacle-retaining position and a position in which said receptacles are freely movable into and removable from said container.

8. The combination defined in claim 6, said gates comprising portions of the front walls of said receptacles, said portions being hinged on horizontal axes to swing to open position when said container and receptacles are tilted to dumping position.

HARRY W. JONES.

REFERENCES CITED

The following references are of record in the file of this patent:

UNITED STATES PATENTS

| Number | Name | Date |
|---|---|---|
| 1,465,005 | Simpson | Aug. 14, 1923 |
| 1,763,560 | Amendolara | June 10, 1930 |
| 1,919,096 | Drewry | July 18, 1933 |
| 2,150,821 | Dempster | Mar. 14, 1939 |
| 2,236,310 | Deal | Mar. 25, 1941 |